(12) United States Patent
Levy

(10) Patent No.: US 9,488,671 B2
(45) Date of Patent: Nov. 8, 2016

(54) ACCELEROMETER WITH FLEXIBLE MOUNTING STRUCTURE

(71) Applicant: ISRAEL AEROSPACE INDUSTRIES LTD., Lod (IL)

(72) Inventor: Oren Levy, Shoham (IL)

(73) Assignee: ISRAEL AEROSPACE INDUSTRIES LTD., Lod (IL)

( * ) Notice: Subject to any disclaimer, the term of this patent is extended or adjusted under 35 U.S.C. 154(b) by 270 days.

(21) Appl. No.: 14/349,043

(22) PCT Filed: Sep. 24, 2012

(86) PCT No.: PCT/IL2012/050389
§ 371 (c)(1),
(2) Date: Apr. 1, 2014

(87) PCT Pub. No.: WO2013/054328
PCT Pub. Date: Apr. 18, 2013

(65) Prior Publication Data
US 2014/0290364 A1  Oct. 2, 2014

(30) Foreign Application Priority Data

Oct. 10, 2011 (IL) .......................................... 215656

(51) Int. Cl.
*G01P 15/02* (2013.01)
*G01P 15/13* (2006.01)
(Continued)

(52) U.S. Cl.
CPC .............. *G01P 15/02* (2013.01); *G01P 1/006* (2013.01); *G01P 1/023* (2013.01); *G01P 15/13* (2013.01); *G01P 2015/0828* (2013.01)

(58) Field of Classification Search
CPC ........ G01P 1/006; G01P 1/023; G01P 15/02; G01P 15/13; G01P 15/131; G01P 15/132; G01P 1/00; G01P 1/003; G01P 2015/0828

USPC .............. 73/493, 497, 866.5, 514.15–514.38
See application file for complete search history.

(56) References Cited

U.S. PATENT DOCUMENTS 3,444,743 A * 5/1969 Siegel ................... G01P 15/132
73/514.24
3,702,073 A 11/1972 Jacobs
(Continued)

FOREIGN PATENT DOCUMENTS

| GB | 2444373 | 6/2008 | |
| WO | WO 8706350 A1 * | 10/1987 | .............. G01P 1/006 |
| WO | WO 00/79287 | 12/2000 | |

OTHER PUBLICATIONS

Lawrence, Modern Inertial Technology, 1993, Springer, Chapter 4 The Pendulous Accelerometer.*
(Continued)

*Primary Examiner* — Michael A Lyons
*Assistant Examiner* — David L Singer
(74) *Attorney, Agent, or Firm* — Dorsey & Whitney LLP

(57) ABSTRACT

An accelerometer for sensing acceleration along a sensing axis, includes a flexure member (having a pendulum member pivotably connected to a support member via a hinge arrangement), a housing, and at least one mounting structure configured for clamping the support member to the housing in load bearing contact while concurrently allowing for differential movement between the support member and the housing. Embodiments also include a corresponding housing member for use with a flexure member of an accelerometer, and a flexure member for use with a housing of an accelerometer.

25 Claims, 8 Drawing Sheets

(51) Int. Cl.
*G01P 1/00* (2006.01)
*G01P 1/02* (2006.01)
*G01P 15/08* (2006.01)

(56) References Cited

U.S. PATENT DOCUMENTS

| | | | | |
|---|---|---|---|---|
| 4,190,782 A | * | 2/1980 | Guess | B06B 1/0666 |
| | | | | 310/324 |
| 4,250,757 A | | 2/1981 | Hanson | |
| 4,498,342 A | | 2/1985 | Aske | |
| 4,592,234 A | * | 6/1986 | Norling | G01P 15/132 |
| | | | | 73/497 |
| 4,697,455 A | * | 10/1987 | Norling | G01P 15/132 |
| | | | | 73/497 |
| 4,750,363 A | | 6/1988 | Norling | |
| 4,779,463 A | * | 10/1988 | Woodruff | G01P 15/132 |
| | | | | 73/497 |
| 4,854,169 A | * | 8/1989 | Sakuma | G01P 1/006 |
| | | | | 248/901 |
| 4,869,105 A | * | 9/1989 | Hartmann | G12B 9/08 |
| | | | | 73/431 |
| 4,932,258 A | | 6/1990 | Norling | |
| 5,005,414 A | * | 4/1991 | Holland | G01P 15/123 |
| | | | | 338/5 |
| 5,024,089 A | * | 6/1991 | Norling | G01P 15/132 |
| | | | | 73/497 |
| 5,090,243 A | * | 2/1992 | Holdren | G01P 15/132 |
| | | | | 73/431 |
| 5,111,694 A | | 5/1992 | Foote | |
| 5,182,949 A | | 2/1993 | Rupnick et al. | |
| 5,212,984 A | * | 5/1993 | Norling | G01P 1/023 |
| | | | | 248/694 |
| 5,287,744 A | | 2/1994 | Norling et al. | |
| 5,763,779 A | | 6/1998 | Foote | |
| 7,073,380 B2 | * | 7/2006 | Foote | B81B 3/0072 |
| | | | | 248/603 |
| 8,901,681 B1 | * | 12/2014 | Foster | B81B 7/0048 |
| | | | | 257/415 |
| 2003/0188578 A1 | * | 10/2003 | Ando | G01P 15/132 |
| | | | | 73/514.36 |
| 2008/0041158 A1 | * | 2/2008 | Yamamoto | G01P 1/023 |
| | | | | 73/514.36 |
| 2010/0192691 A1 | * | 8/2010 | Yamamoto | G01P 15/132 |
| | | | | 73/514.21 |
| 2011/0209545 A1 | * | 9/2011 | Kuramoto | G01P 15/125 |
| | | | | 73/514.21 |

OTHER PUBLICATIONS

International Search Report and Written Opinion from International Application No. PCT/IL2012/050389 mailed Jan. 25, 2013.

* cited by examiner

ACCELEROMETER WITH FLEXIBLE MOUNTING STRUCTURE

TECHNOLOGICAL FIELD

The presently disclosed subject matter relates to sensing instruments, in particular to accelerometers.

BACKGROUND

Devices for sensing accelerations are well known and have many uses.

One class of such devices, referred to herein as accelerometers, includes a proof mass mounted to a support by flexures via a support ring, and further includes capacitors. The proof mass is displaced from a datum position by an acceleration applied to the device along its sensing axis, and the resulting differential capacitance is sensed by a feedback circuit which in turn generates a current that can be applied to force balancing coils to return the proof mass to the datum position. The acceleration can thus be related to the magnitude of this current.

The support ring is clamped in position in the device, which can lead to thermal strains as well as mounting strains being coupled to the flexures, which in turn can lead to bias sensitivity to temperature and to mounting, respectively, which can cause bias error and thus degrade the sensitivity and performance of the device.

By way of general background, the following publications disclose various accelerator configurations: U.S. Pat. Nos. 3,702,073, 4,250,757, 4,498,342, 4,932,258, 5,111,694, 5,182,949, 5,287,744, and 5,763,779.

GENERAL DESCRIPTION

According to a first aspect of the presently disclosed subject matter there is provided an accelerometer for sensing acceleration along a sensing axis, comprising:
 a flexure member, comprising a pendulum member pivotably connected to a support member via a hinge arrangement;
 a housing;
 at least one mounting structure, for example a plurality of mounting structures, configured for clamping the support member to the housing in load bearing contact while concurrently allowing for differential movement between the support member and the housing, for example in a direction orthogonal to said sensing axis.

In at least some examples, at least one said mounting structure comprises an elongate mounting post, anchored at a first longitudinal end thereof to the housing and anchored at the second longitudinal end thereof to the support member, wherein the mounting post is configured for allowing displacement between said first longitudinal end and said second longitudinal end in at least one direction different from said sensing axis to permit at least a portion of said differential movement between the support member and the housing.

In at least some examples, at least one said mounting structure comprises an elongate mounting post, anchored at a first longitudinal end thereof to the housing and anchored at the second longitudinal end thereof to the support member, wherein the mounting post is configured for allowing displacement between said first longitudinal end and said second longitudinal end in at least one direction non-parallel to said sensing axis to permit at least a portion of said differential movement between the support member and the housing.

In at least some examples, at least one said mounting structure comprises an elongate mounting post, anchored at a first longitudinal end thereof to the housing and anchored at the second longitudinal end thereof to the support member, wherein the mounting post is configured for allowing displacement between said first longitudinal end and said second longitudinal end in at least one direction non-parallel to said sensing axis to permit at least a portion of said differential movement between the support member and the housing.

In at least some examples, at least one said mounting structure comprises an elongate mounting post, anchored at a first longitudinal end thereof to the housing and anchored at the second longitudinal end thereof to the support member, wherein the mounting post is configured for allowing displacement between said first longitudinal end and said second longitudinal end in at least one direction orthogonal to said sensing axis to permit at least a portion of said differential movement between the support member and the housing.

In at least some examples, said mounting post is cantilevered from said housing at said first longitudinal end and removably affixed to said support member at said second longitudinal end. Optionally, said mounting post is integrally formed with or fixedly mounted to said housing. Additionally or alternatively, said mounting post is accommodated within a well formed in said housing, and wherein said second longitudinal end projects outwardly from a mouth of said well.

In at least some examples, said mounting post is removably affixed to said housing at said first longitudinal end and cantilevered from said support member at said second longitudinal end. Optionally, said mounting post is integrally formed with or fixedly mounted to said support member. Additionally or alternatively, said mounting post is accommodated within a well formed in said housing, and wherein said first longitudinal end is removably affixed to a base of said well.

In at least some examples optionally including at least one of the above examples, said mounting post is formed as a solid beam element having a cross-section that is uniform or varies along the longitudinal axis of the beam element. By way of non-limiting example, said cross-section is circular, or oval, or square or rectangular or other polygonal. Additionally or alternatively, and by way of non-limiting example, a ratio of a length of said mounting post or of said beam element to a width of said mounting post or of said beam element in the range about 0.3 to about 10, more preferably in the range about 1 to about 5, and more preferably about 3.

Additionally or alternatively, and by way of non-limiting example, said mounting post or said beam element is spaced from said well by a spacing that is within about 10% and 20% of a width of said mounting post or said beam element.

In at least some examples optionally including at least one of the above examples, said mounting post is configured for allowing displacement between said first longitudinal end and said second longitudinal end in a plurality of directions orthogonal to said sensing axis.

In at least some examples optionally including at least one of the above examples, said mounting post is configured for preferentially allowing displacement between said first longitudinal end and said second longitudinal end in a first direction orthogonal to said sensing axis while providing relative resistance to such displacement along a second direction orthogonal to said sensing axis as compared with said first direction.

In at least some examples optionally including at least one of the above examples, said housing comprising two housing members configured for accommodating therebetween said flexure member. By way of non-limiting example, the accelerometer comprises at least three said mounting structures associated with each said housing member. For example, each said mounting structure associated with one said housing member is in longitudinally opposed relationship with a corresponding said mounting structure associated with the other said housing member. Additionally or alternatively, said pendulum member pivotably connected to said support member via a hinge arrangement, and wherein said mounting structures are located with respect to said flexure member at positions of 90°, 180° and 270° about a center axis thereof, the 0° position being associated with said hinge arrangement.

In at least some examples optionally including at least one of the above examples, said mounting structures are configured for isolating said pendulum member from strain effects arising from said differential movement.

In at least some examples optionally including at least one of the above examples, said flexure member and said housing comprise different thermal properties one from the other at least along directions orthogonal to said sensing axis.

In at least some examples optionally including at least one of the above examples, said flexure member and said housing are made from materials having different coefficients of thermal expansion one from the other at least along directions orthogonal to said sensing axis.

In at least some examples optionally including at least one of the above examples, said flexure member is made from a non-metallic material and said housing is made from a metallic material.

In at least some examples optionally including at least one of the above examples, said flexure member is made from any suitable material, including, for example, at least one of the following: any suitable metallic material or metal, for example stainless steel, aluminium, titanium or alloys thereof; composites; silicon; fused quartz or other suitable ceramics; any suitable non-metallic material.

In at least some examples optionally including at least one of the above examples, said housing is made from any suitable material, including, for example, at least one of the following: any suitable metallic material or metal, for example stainless steel, aluminium, titanium or alloys thereof; composites; silicon; fused quartz or other suitable ceramics; any suitable non-metallic material.

In at least some examples optionally including at least one of the above examples, said mounting structure is at least one of deformable bendable and shearable for allowing said differential movement between the support member and the housing.

In at least some examples optionally including at least one of the above examples, said mounting post is configured for allowing displacement between said first longitudinal end and said second longitudinal end in a direction orthogonal to said sensing axis by any one of bending, deforming or shearing of the mounting post with respect to a longitudinal axis of the mounting post.

In at least some examples optionally including at least one of the above examples, said mounting structure is slidable for allowing said differential movement between the support member and the housing.

In at least some examples, at least one said mounting structure comprises an elongate mounting post, anchored at a first longitudinal end thereof to a first one of said housing and said support member, and having a second longitudinal end thereof configured for sliding displacement with respect to a second one of said housing and said support member, wherein the mounting post is configured for allowing sliding displacement between said second longitudinal end and said second one of said housing and said support member in a direction different from said sensing axis to permit at least a portion of said differential movement between the support member and the housing.

In at least some examples, at least one said mounting structure comprises an elongate mounting post, anchored at a first longitudinal end thereof to a first one of said housing and said support member, and having a second longitudinal end thereof configured for sliding displacement with respect to a second one of said housing and said support member, wherein the mounting post is configured for allowing sliding displacement between said second longitudinal end and said second one of said housing and said support member in a direction non-parallel to said sensing axis to permit at least a portion of said differential movement between the support member and the housing.

In at least some examples, at least one said mounting structure comprises an elongate mounting post, anchored at a first longitudinal end thereof to a first one of said housing and said support member, and having a second longitudinal end thereof configured for sliding displacement with respect to a second one of said housing and said support member, wherein the mounting post is configured for allowing sliding displacement between said second longitudinal end and said second one of said housing and said support member in a direction orthogonal to said sensing axis to permit at least a portion of said differential movement between the support member and the housing.

In at least some examples optionally including at least one of the above examples, the accelerometer further comprises an force sensing system configured for sensing movement of the pendulum member from a datum position in response to an acceleration or force applied to accelerometer along said sensing axis and for generating an output that is a measure of said acceleration or force.

In at least some examples optionally including at least one of the above examples, the accelerometer further comprises an force sensing system configured for sensing movement of the pendulum member from a datum position in response to an acceleration or force applied to accelerometer parallel to said sensing axis, for generating a restoring or balancing force to the pendulum member to return the pendulum member to the datum position, and for generating an output that is indicative of the restoring force, which in turn provides a measure of said acceleration or said force.

In at least some examples optionally including at least one of the above examples, said force sensing system comprises stators, capacitors and balancing coils, and an electronics package for operation thereof.

In at least some examples optionally including at least one of the above examples, at least one said mounting structure is configured for clamping in load bearing contact the support member to the housing in a direction generally parallel to said sensing axis while concurrently allowing for said differential movement between the support member and the housing in at least one direction orthogonal to said sensing axis.

According to a second aspect of the presently disclosed subject matter there is also provided a housing member for use with a flexure member of an accelerometer, the housing member comprising at least one mounting structure or a plurality of mounting structures configured for clamping in load bearing contact the flexure member to the housing member while concurrently allowing for differential movement between the support member and the housing member, for example in a direction orthogonal to the sensing axis.

In at least some examples said mounting structure is at least one of deformable bendable and shearable for allowing said differential movement between the support member and the housing.

In at least some examples optionally including at least one of the above examples for the second aspect of the presently disclosed subject matter at least, at least one said mounting structure comprises an elongate mounting post, anchored at a first longitudinal end thereof to the housing member and configured for being anchored at the second longitudinal end thereof to the support member, wherein the mounting post is configured for allowing displacement between said first longitudinal end and said second longitudinal end in at least one direction different from said sensing axis to permit at least a portion of said differential movement between the support member and the housing member.

In at least some examples optionally including at least one of the above examples for the second aspect of the presently disclosed subject matter at least, at least one said mounting structure comprises an elongate mounting post, anchored at a first longitudinal end thereof to the housing member and configured for being anchored at the second longitudinal end thereof to the support member, wherein the mounting post is configured for allowing displacement between said first longitudinal end and said second longitudinal end in at least one direction non-parallel to said sensing axis to permit at least a portion of said differential movement between the support member and the housing member.

In at least some examples optionally including at least one of the above examples for the second aspect of the presently disclosed subject matter at least, at least one said mounting structure comprises an elongate mounting post, anchored at a first longitudinal end thereof to the housing member and configured for being anchored at the second longitudinal end thereof to the support member, wherein the mounting post is configured for allowing displacement between said first longitudinal end and said second longitudinal end in at least one direction orthogonal to said sensing axis to permit at least a portion of said differential movement between the support member and the housing member.

In at least some examples optionally including at least one of the above examples for the second aspect of the presently disclosed subject matter at least, said mounting post is cantilevered from said housing member at said first longitudinal end and removably affixed to said support member at said second longitudinal end. Optionally, said mounting post is integrally formed with or fixedly mounted to said housing member. Additionally or alternatively, said mounting post is accommodated within a well formed in said housing member, and wherein said second longitudinal end projects outwardly from a mouth of said well.

In at least some examples optionally including at least one of the above examples for the second aspect of the presently disclosed subject matter at least, said mounting post is formed as a solid beam element having a cross-section that is uniform or varies along the longitudinal axis of the beam element. By way of non-limiting example, said cross-section is circular, or oval, or square or rectangular or other polygonal. Additionally or alternatively, and by way of non-limiting example, a ratio of a length of said mounting post or of said beam element to a width of said mounting post or of said beam element in the range about 0.3 to about 10, more preferably in the range about 1 to about 5, and more preferably about 3. Additionally or alternatively, and by way of non-limiting example, said mounting post or said beam element is spaced from said well by a spacing that is within about 10% and 20% of a width of said mounting post or said beam element.

In at least some examples optionally including at least one of the above examples for the second aspect of the presently disclosed subject matter at least, said mounting post is configured for allowing displacement between said first longitudinal end and said second longitudinal end in a plurality of directions orthogonal to said sensing axis.

In at least some examples optionally including at least one of the above examples for the second aspect of the presently disclosed subject matter at least, said mounting post is configured for preferentially allowing displacement between said first longitudinal end and said second longitudinal end in a first direction orthogonal to said sensing axis while providing relative resistance to such displacement along a second direction orthogonal to said sensing axis as compared with said first direction.

In at least some examples optionally including at least one of the above examples for the second aspect of the presently disclosed subject matter at least, said housing member is configured for mounting to another housing member for accommodating therebetween the flexure member.

In at least some examples optionally including at least one of the above examples for the second aspect of the presently disclosed subject matter at least, there are at least three said mounting structures associated with said housing member. Additionally or alternatively, said mounting structures are located with respect to the housing member at positions of 90°, 180° and 270° about a center axis thereof, the 0° position being associated with a hinge arrangement of the flexure member.

In at least some examples optionally including at least one of the above examples for the second aspect of the presently disclosed subject matter at least, said housing member comprises different thermal properties from the flexure member at least along directions orthogonal to said sensing axis.

In at least some examples optionally including at least one of the above examples for the second aspect of the presently disclosed subject matter at least, said housing member is made from materials having a coefficient of thermal expansion different from that of the flexure member, at least along directions orthogonal to said sensing axis.

In at least some examples optionally including at least one of the above examples for the second aspect of the presently disclosed subject matter at least, said housing member is made from any suitable material, including, for example, at least one of the following: any suitable metallic material or metal, for example stainless steel, aluminium, titanium or alloys thereof; composites; silicon; fused quartz or other suitable ceramics; any suitable non-metallic material.

In at least some examples optionally including at least one of the above examples for the second aspect of the presently disclosed subject matter at least, said mounting post is configured for allowing displacement between said first longitudinal end and said second longitudinal end in a direction orthogonal to said sensing axis by any one of bending, deforming or shearing of the mounting post with respect to a longitudinal axis of the mounting post.

In at least some examples optionally including at least one of the above examples for the second aspect of the presently disclosed subject matter at least, at least one said mounting structure comprises an elongate mounting post, anchored at a first longitudinal end thereof to said housing, and having a second longitudinal end thereof configured for sliding displacement with respect to the flexure member, wherein the mounting post is configured for allowing sliding displacement between said second longitudinal end and the flexure member in a direction different from said sensing axis to permit at least a portion of said differential movement between the support member and the housing.

In at least some examples optionally including at least one of the above examples for the second aspect of the presently disclosed subject matter at least, at least one said mounting structure comprises an elongate mounting post, anchored at a first longitudinal end thereof to said housing, and having a second longitudinal end thereof configured for sliding displacement with respect to the flexure member, wherein the mounting post is configured for allowing sliding displacement between said second longitudinal end and the flexure member in a direction non-parallel to said sensing axis to permit at least a portion of said differential movement between the support member and the housing.

In at least some examples optionally including at least one of the above examples for the second aspect of the presently disclosed subject matter at least, at least one said mounting structure comprises an elongate mounting post, anchored at a first longitudinal end thereof to said housing, and having a second longitudinal end thereof configured for sliding displacement with respect to the flexure member, wherein the mounting post is configured for allowing sliding displacement between said second longitudinal end and the flexure member in a direction orthogonal to said sensing axis to permit at least a portion of said differential movement between the support member and the housing.

In at least some examples optionally including at least one of the above examples for the second aspect of the presently disclosed subject matter at least, the housing member further comprises at least a part of an force sensing system configured for sensing movement of the pendulum member from a datum position in response to an acceleration or force applied to accelerometer along said sensing axis and for generating an output that is a measure of said acceleration or force.

In at least some examples optionally including at least one of the above examples for the second aspect of the presently disclosed subject matter at least, the housing member further comprises at least a part of an force sensing system configured for sensing movement of the pendulum member from a datum position in response to an acceleration or force applied to accelerometer parallel to said sensing axis, for generating a restoring or balancing force to the pendulum member to return the pendulum member to the datum position, and for generating an output that is indicative of the restoring force, which in turn provides a measure of said acceleration or said force.

In at least some examples optionally including at least one of the above examples for the second aspect of the presently disclosed subject matter at least, said force sensing system comprises stators, capacitors and balancing coils, and an electronics package for operation thereof.

In at least some examples optionally including at least one of the above examples for the second aspect of the presently disclosed subject matter at least, said mounting structures are configured for clamping in load bearing contact a support member of the flexure member to the housing in a direction generally parallel to said sensing axis while concurrently allowing for said differential movement between the support member and the housing in at least one direction different from said sensing axis.

In at least some examples optionally including at least one of the above examples for the second aspect of the presently disclosed subject matter at least, said mounting structures are configured for clamping in load bearing contact a support member of the flexure member to the housing in a direction generally parallel to said sensing axis while concurrently allowing for said differential movement between the support member and the housing in at least one direction non-parallel to said sensing axis.

In at least some examples optionally including at least one of the above examples for the second aspect of the presently disclosed subject matter at least, said mounting structures are configured for clamping in load bearing contact a support member of the flexure member to the housing in a direction generally parallel to said sensing axis while concurrently allowing for said differential movement between the support member and the housing in at least one direction orthogonal to said sensing axis.

According to a third aspect of the presently disclosed subject matter there is also provided a flexure member for use with a housing of an accelerometer, comprising a pendulum member hingedly connected to a support member via a hinge arrangement, and further comprising at least one mounting structure or a plurality of mounting structures configured for clamping in load bearing contact the support member to the housing while concurrently allowing for differential movement between the support member and the housing, for example in a direction orthogonal to said sensing axis.

In at least some examples said mounting structure is at least one of deformable bendable and shearable for allowing said differential movement between the support member and the housing.

In at least some examples optionally including at least one of the above examples for the third aspect of the presently disclosed subject matter at least, at least one said mounting structure comprises an elongate mounting post, configured to be anchored at a first longitudinal end thereof to the housing and anchored at the second longitudinal end thereof to the support member, wherein the mounting post is configured for allowing displacement between said first longitudinal end and said second longitudinal end in at least one direction different from said sensing axis to permit at least a portion of said differential movement between the support member and the housing.

In at least some examples optionally including at least one of the above examples for the third aspect of the presently disclosed subject matter at least, at least one said mounting structure comprises an elongate mounting post, configured to be anchored at a first longitudinal end thereof to the housing and anchored at the second longitudinal end thereof to the support member, wherein the mounting post is configured for allowing displacement between said first longitudinal end and said second longitudinal end in at least one direction non-parallel to said sensing axis to permit at least a portion of said differential movement between the support member and the housing.

In at least some examples optionally including at least one of the above examples for the third aspect of the presently disclosed subject matter at least, at least one said mounting structure comprises an elongate mounting post, configured to be anchored at a first longitudinal end thereof to the housing and anchored at the second longitudinal end thereof to the support member, wherein the mounting post is configured for allowing displacement between said first longitudinal end and said second longitudinal end in at least one direction orthogonal to said sensing axis to permit at least a portion of said differential movement between the support member and the housing.

In at least some examples optionally including at least one of the above examples for the third aspect of the presently disclosed subject matter at least, said mounting post is configured for being removably affixed to said housing at said first longitudinal end and cantilevered from said support member at said second longitudinal end. Optionally, said mounting post is integrally formed with or fixedly mounted to said support member. Additionally or alternatively, said mounting post is for being accommodated within a well formed in said housing, and wherein said first longitudinal end is removably affixed to a base of said well.

In at least some examples optionally including at least one of the above examples for the third aspect of the presently disclosed subject matter at least, said mounting post is formed as a solid beam element having a cross-section that is uniform or varies along the longitudinal axis of the beam element. By way of non-limiting example, said cross-section is circular, or oval, or square or rectangular or other polygonal. Additionally or alternatively, and by way of non-limiting example, a ratio of a length of said mounting post or of said beam element to a width of said mounting post or of said beam element in the range about 0.3 to about 10, more preferably in the range about 1 to about 5, and more preferably about 3. Additionally or alternatively, and by way of non-limiting example, said mounting post or said beam element is spaced from said well by a spacing that is within about 10% and 20% of a width of said mounting post or said beam element.

In at least some examples optionally including at least one of the above examples for the third aspect of the presently disclosed subject matter at least, said mounting post is configured for allowing displacement between said first longitudinal end and said second longitudinal end in a plurality of directions orthogonal to said sensing axis.

In at least some examples optionally including at least one of the above examples for the third aspect of the presently disclosed subject matter at least, said mounting post is configured for preferentially allowing displacement between said first longitudinal end and said second longitudinal end in a first direction orthogonal to said sensing axis while providing relative resistance to such displacement along a second direction orthogonal to said sensing axis as compared with said first direction.

In at least some examples optionally including at least one of the above examples for the third aspect of the presently disclosed subject matter at least, the housing comprising two housing members and the flexure member is configured for being accommodated therebetween. By way of non-limiting example, the flexure member comprises at least three pairs of said mounting structures. For example, in each said pair, one said mounting structure associated is in longitudinally opposed relationship with the other said mounting structure. Additionally or alternatively, said pendulum member pivotably connected to said support member via a hinge arrangement, and said mounting structures are located with respect to said flexure member at positions of 90°, 180° and 270° about a center axis thereof, the 0° position being associated with said hinge arrangement.

In at least some examples optionally including at least one of the above examples for the third aspect of the presently disclosed subject matter at least, said mounting structures are configured for isolating said pendulum member from strain effects arising from said differential movement.

In at least some examples optionally including at least one of the above example for the third aspect of the presently disclosed subject matter at least, said flexure member comprises different thermal properties from those of the housing at least along directions orthogonal to said sensing axis.

In at least some examples optionally including at least one of the above examples for the third aspect of the presently disclosed subject matter at least, said flexure member is made from materials having a coefficient of thermal expansion different from that of the housing at least along directions orthogonal to said sensing axis.

In at least some examples optionally including at least one of the above examples for the third aspect of the presently disclosed subject matter at least, said flexure member is made from any suitable material, including, for example, at least one of the following: any suitable metallic material or metal, for example stainless steel, aluminium, titanium or alloys thereof; composites; silicon; fused quartz or other suitable ceramics; any suitable non-metallic material.

In at least some examples optionally including at least one of the above examples for the third aspect of the presently disclosed subject matter at least, said mounting post is configured for allowing displacement between said first longitudinal end and said second longitudinal end in a direction orthogonal to said sensing axis by any one of bending, deforming or shearing of the mounting post with respect to a longitudinal axis of the mounting post.

In at least some examples, at least one said mounting structure comprises an elongate mounting post, anchored at a first longitudinal end thereof to said support member, and having a second longitudinal end thereof configured for sliding displacement with respect to the housing, wherein the mounting post is configured for allowing sliding displacement between said second longitudinal end and said second one of the housing and said support member in a direction different from said sensing axis to permit at least a portion of said differential movement between the support member and the housing.

In at least some examples, at least one said mounting structure comprises an elongate mounting post, anchored at a first longitudinal end thereof to said support member, and having a second longitudinal end thereof configured for sliding displacement with respect to the housing, wherein the mounting post is configured for allowing sliding displacement between said second longitudinal end and said second one of the housing and said support member in a direction non-parallel to said sensing axis to permit at least a portion of said differential movement between the support member and the housing.

In at least some examples, at least one said mounting structure comprises an elongate mounting post, anchored at a first longitudinal end thereof to said support member, and having a second longitudinal end thereof configured for sliding displacement with respect to the housing, wherein the mounting post is configured for allowing sliding displacement between said second longitudinal end and said second one of the housing and said support member in a direction orthogonal to said sensing axis to permit at least a portion of said differential movement between the support member and the housing.

In at least some examples optionally including at least one of the above examples for the third aspect of the presently disclosed subject matter at least, said mounting structures are configured for clamping in load bearing contact the support member to the housing in a direction generally parallel to said sensing axis while concurrently allowing for said differential movement between the support member and the housing in at least one direction different from said sensing axis.

In at least some examples optionally including at least one of the above examples for the third aspect of the presently disclosed subject matter at least, said mounting structures are configured for clamping in load bearing contact the support member to the housing in a direction generally parallel to said sensing axis while concurrently allowing for said differential movement between the support member and the housing in at least one direction non-parallel to said sensing axis.

In at least some examples optionally including at least one of the above examples for the third aspect of the presently disclosed subject matter at least, said mounting structures are configured for clamping in load bearing contact the support member to the housing in a direction generally parallel to said sensing axis while concurrently allowing for said differential movement between the support member and the housing in at least one direction orthogonal to said sensing axis.

BRIEF DESCRIPTION OF THE DRAWINGS

In order to understand the disclosure and to see how it may be carried out in practice, examples will now be described, by way of non-limiting example only, with reference to the accompanying drawings, in which:

in FIG. 3(a) there is no differential displacement between the support ring and the housing; in FIG. 3(b) there is differential displacement between the support ring and the housing.

DETAILED DESCRIPTION

Figure 1:
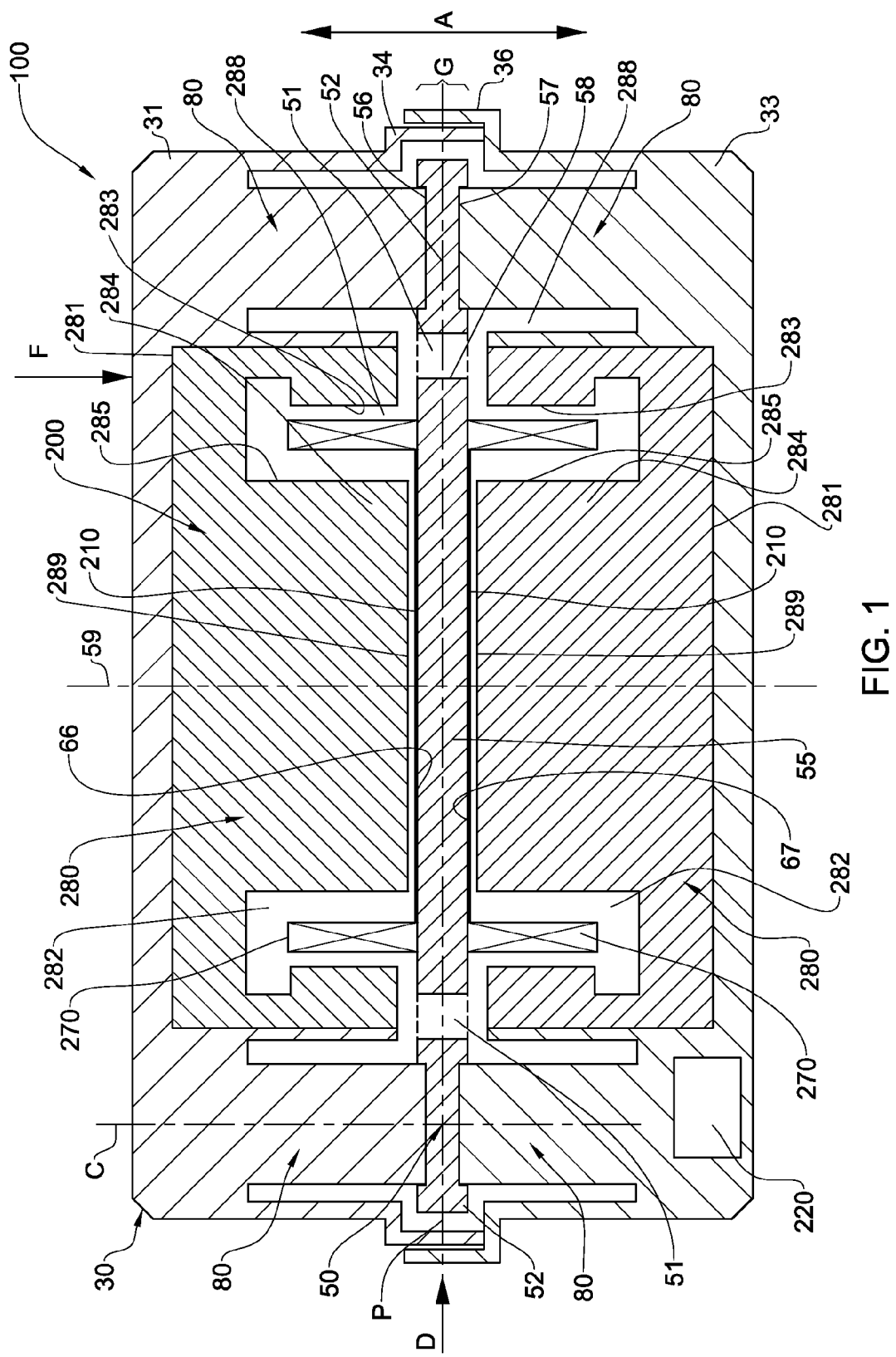
FIG. 1 is a transverse cross-sectional view of an accelerometer according to one example of the presently disclosed subject matter, comprising a mounting structure according to a first example of the presently disclosed subject matter.

Referring to FIG. 1, an accelerometer according to a first example of the presently disclosed subject matter, generally designated 100, comprises housing 30, and flexure member 50. The accelerator 100 defines sensing axis A and is configured for sensing accelerations along this axis.

Figure 2:
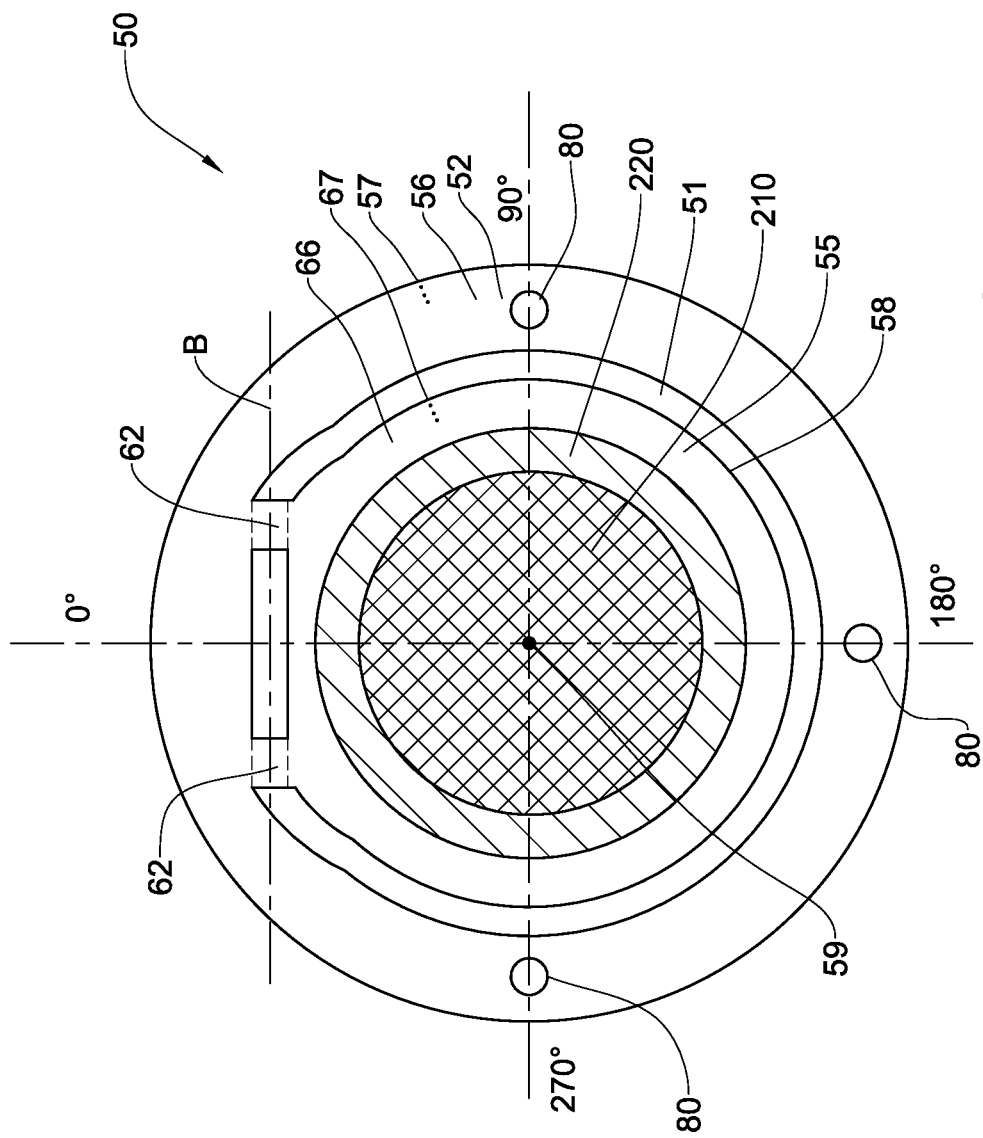
FIG. 2 is a plan view of the flexure member of the accelerometer example of FIG. 1.

Referring also to FIG. 2, flexure member 50, also referred to interchangeably herein as a reed, has a generally disc like shape and comprises a support member in the form of generally annular support ring 52 (also referred to interchangeably herein as a support frame) and pendulum 55 (also referred to interchangeably herein as a paddle or as a proof mass) which has a generally disc like shape. An imaginary plane P can be defined with respect to the flexure member 50, in particular with respect to the support ring 52, generally orthogonal to the sensing axis A (see FIG. 1). Plane P can be coplanar with either one of the opposite-facing annular faces 56, 57 of the support ring 52, or can be located anywhere inbetween faces 56, 57, for example. A datum or null position D for the pendulum 55 can be defined as the position of the pendulum 55 with respect to the support ring 52 when there is an absence of any acceleration or force F acting on the accelerator along sensing axis A and no restoring force is generated by the accelerometer 100. In this example, in the datum position D the pendulum 55 is generally coplanar with the support ring 52.

In alternative variations of this example the support member or support ring 52 can have a different form, for example rectangular or other polygonal shape, which can be closed or open, and/or the pendulum 55 can have a different form, for example rectangular or other polygonal shape, which can be closed or open.

The pendulum 55 is connected to the support ring 52 via a hinge arrangement in the form of hinge structures 62, which are displaced from the geometric centre and center of gravity of the pendulum 55. The hinge structures 62 are, in this example, formed as flexures or film hinges, and define a single hinge axis B generally parallel to the plane P. Thus, in this example the hinge axes of the hinge structures are co-axial, but in alternative variations of this example hinge axes can be non-coaxial, for example parallel but spaced from one another, or can intersect one another (optionally also both parallel to plane P). The hinge structures 62 enable the pendulum 55 to pivot with respect to the support ring 52 about hinge axis B, which is generally orthogonal to sensing axis A (although in alternative variations of this example the in hinge axis can be non-orthogonal to sensing axis A). The pendulum 55 is generally circular about an axis 59 (parallel to sensing axis A), and is spaced from the support ring 52 by gap 51 along most of pendulum perimeter 58 excluding the locations of the hinge structures 62. In alternative variations of this example the pendulum can be non-circular, for example polygonal, oval and so on.

The flexure member 50 can be made from any suitable material, including, for example, at least one of the following: any suitable metal, for example stainless steel, aluminium, titanium or alloys thereof; composites; silicon; fused quartz or other suitable ceramics.

Housing 30 includes housing members 31 and 33 which interconnect via interconnecting flanges 34, 36, or are otherwise joined to one another. In this example the housing 30, and the housing members 31 and 33 are generally cylindrical about an axis generally coaxial with sensing axis A, though in alternative variation of this example the housing 30, and the housing members 31 and 33 can have any other suitable shape.

When joined together, the housing members 31 and 33 define a gap G for accommodating therein the flexure member 50 in clamping contact therewith via mounting structures 80, as will be disclosed in greater detail herein.

For example, the housing members 31, 33 are made any suitable material, including, for example, at least one of the following: any suitable metal, for example stainless steel, aluminium, titanium or alloys thereof; composites; silicon; fused quartz or other suitable ceramics.

The accelerometer 100 further comprises a suitable force sensing system 200 for operation of the accelerometer 100, and in particular is configured for sensing movement of the pendulum 55 from the datum position in response to an acceleration or force F applied to accelerometer 100 along sensing axis A, and for generating an output that is a measure of the acceleration or force F. In particular, the electromagnetic system 200 is configured for sensing movement of the pendulum 55 from the datum position D in response to an acceleration or force F applied to accelerometer 100 parallel to sensing axis A, for generating a restoring or balancing force to the pendulum 55 to return this to the datum position D, and for generating an output that is indicative of the restoring force, which in turn provides a measure of the acceleration or force F.

The force sensing system 200 is mounted within the housing 30 and, in this example, is in the form of an electromagnetic sensing system, comprising an electronics package 220, stators 280 and balancing coils 270. The electronics package 220 operatively connected to stators 280 and coils 270, and further comprises electrical connections (not shown) on the outside of the housing 30, for routing electrical power to the force sensing system 200 from an external power source, and/or for outputting the aforesaid output of the electro magnetic system 200.

Each stator 280 is accommodated in a recess 281 formed in a respective one of housing members 31 and 33, and is generally cylindrical, having a respective inner bore 282, generally concentric with axis 59, and a permanent magnet 284 concentrically accommodated in the bore 282 to define an annular gap 288 between the outer facing cylindrical surface 285 of the magnet 284 and the inner facing cylindrical surface 283 of the bore 282.

The coils 270 are mounted to the pendulum 55, one on each of face 66 and face 67 thereof, generally concentric with axis 59 and inwardly spaced from the pendulum perimeter 58. In the assembled accelerometer 100, each coil 270 is accommodated in the respective bore 282, in particular the respective gap 288, with the respective magnet 284 positioned within the respective coil 270.

A capacitor plate 210 is provided on each face 66, 67 of pendulum 55, and each capacitor plate 210 forms a capacitor with facing surface 289 of the respective magnet 284. The two capacitors are part of a pick-off or feedback circuit (typically comprised in the electronics package 220) for sensing movement of the pendulum 55 from the datum position D.

In operation, an acceleration or force F applied to the accelerometer 100 along sensing axis A results in a pendulous pivotal movement of the pendulum 55 with respect to axis B, in particular about axis B, and thus pendulum 55 moves with respect to the support ring 52, the housing members 31, 33, and the stators 280. This causes a change in the spacing between each capacitor plate 210 and the facing surface 289 of the respective magnet 284, which results in a differential capacitance change that is sensed by the feedback circuit comprised in the electronics package 220. The feedback circuit almost concurrently applies a suitable current/voltage to the balance coils 270 that, via interaction with the magnets 284, generates a balancing force to the pendulum 55 such as to return the pendulum 55 to the datum position D. The current/voltage that is required for maintaining the pendulum 55 at the datum position D provides a measure of the acceleration or force F that is acting to the accelerometer 100, and a suitable output corresponding to this current/voltage, for example a digital or analog signal, is generated by the electronics package 220.

In alternative variations of this example the force sensing system 200 can thus comprise any such system currently known in the art or developed in the future for the stated purpose, for example as disclosed in any one of U.S. Pat. Nos. 3,702,073, 4,250,757, 4,498,342, 4,932,258, 5,111,694, 5,182,949, 5,287,744, and 5,763,779, the contents of which are incorporated herein in their entirety, or can include other types of force sensing systems, for example based on sensing and/or generating electrostatic forces or bimetallic forces generated as a result of the applied force or acceleration along the sensing axis A.

As already indicated, when the accelerometer is assembled, the flexure member 50 is accommodated in gap G and is in clamping contact with the housing members 31 and 33 via mounting structures 80. The accelerometer 100 thus comprises a plurality of mounting structures 80, which are configured for clamping the support ring 52 to the housing 30 in a direction parallel to sensing axis A while concurrently allowing for differential movement between the support ring 52 and the housing 30 in a direction orthogonal to sensing axis A.

The mounting structures 80 are configured for clamping the support ring 52 to the housing members 31 and 33 in a direction parallel to sensing axis A, while concurrently allowing limited relative movement between the support ring 52 and the housing members 31 and 33 in one or more directions different from sensing axis A, i.e., non-parallel to sensing axis A. In particular, the mounting structures 80 are configured for clamping the support ring 52 to the housing members 31 and 33 in a direction parallel to sensing axis A, while concurrently allowing limited relative movement between the support ring 52 and the housing members 31 and 33 in one or more directions orthogonal to sensing axis A, i.e., parallel to plane P.

In at least some examples including the example of FIG. 1, the mounting structures 80 act as a mechanical buffer between the support ring 52 and the housing members 31 and 33.

In this example, three pairs of mounting structures 80 are provided, three mounting structures 80 in housing member 31 in opposed relationship with three mounting structures 80 in housing member 33. The mounting structures 80 are located at positions 90°, 180° and 270° on plane P with respect to the flexure member 50 and axis 59, the 0° position being in-between the hinge structures 62, as illustrated in FIG. 2.

Figure 3A:
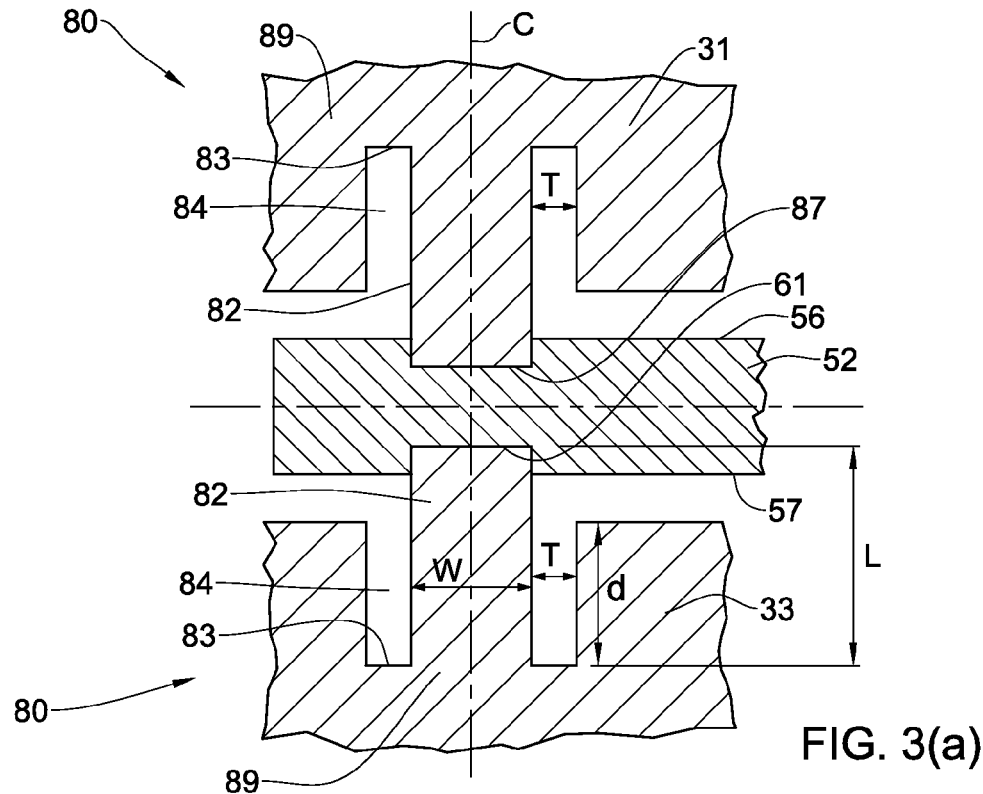
FIGS. 3(a) and 3(b) are partial transverse cross-sectional views of the example of the mounting structure of FIG. 1.
Figure 3B:
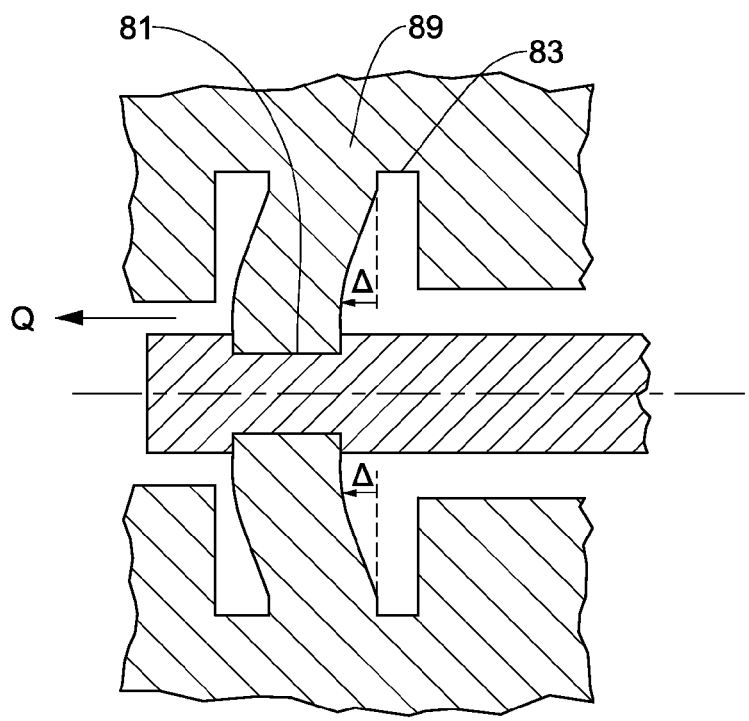

Referring also to FIGS. 3(a) and 3(b), each mounting structure 80 according to a first example thereof, comprises an elongate mounting post 82, a base end 89 thereof being anchored to the respective housing member 31 or 33. The base end 89 is cantilevered from the base 83 of a well 84 formed on the respective housing member 31 or 33. The mounting post 82 is concentrically received in the well 84 and is separated from the walls 85 thereof by a lateral gap T. The mounting post 82 has a length L greater than the depth d of well 84 so that the free end 81 of the post 82 projects from the mouth of the well 84.

Mounting post 82 is in the form of a solid beam element, generally prismatic, having a uniform cross-section along its longitudinal length from base end 89 to free end 81, which are aligned along longitudinal axis C, generally parallel to the sensing axis A. In the assembled accelerometer 100, free end 81 of each mounting structure 80 is anchored to the support ring 52. The free end 81 comprises a generally flat face 87 and is received in a complementarily-shaped shallow recess 61 formed in the faces 56, 57 of support ring 52. The shallow recesses 61 facilitate alignment of the support ring 52 with respect to the housing members 31 and 33 during assembly of the accelerometer 100. In alternative variations of this example the support rings lacks one or more of the recesses 61, and the respective face(s) 87 abut the respective face 56 or face 57 directly, and are anchored thereto by frictional or shear forces thereat.

Referring to FIG. 3(b) in particular, each mounting post 82 is configured for allowing the free end 81 thereof to be displaced with respect to the base end 89 or to the base 83 (and thus with respect to the rest of the respective housing member 31 or 33) by a displacement A responsive to a lateral force Q being applied to the free end 81, in a direction generally parallel to plane P. In particular, such a displacement is reversible, so that in the absence of force Q, the free end 81 returns to its initial position with respect to the base end 89. In this example, such a displacement is provided by any one of reversible bending, or otherwise deforming (including shearing) the mounting post 82.

In operation, when the support ring 52 on the one hand, and the housing 30 in particular housing members 31 and 33 on the other hand, have different thermal properties, for example are made from materials having different coefficients of thermal expansion (at least along directions parallel to plane P, i.e., at least along directions orthogonal to the sensing axis A), and the accelerometer is subjected to a change in temperature, for example heating or cooling, such that the accelerometer experiences a change in temperature, the support ring 52 expands or contracts along a direction parallel to plane P by an amount that is different from the respective expansion or contraction of the housing members 31 and 33. The differential thermal expansions or contractions result in the free end 81 of each mounting post 82 (which is clampingly mounted (i.e., anchored) to the support ring 52) moving laterally with respect to the respective base end 89 (which is affixed (i.e., anchored) to the respective housing member 31 or 33) as seen in FIG. 3b), for example. In one example, the housing members 31 and 33 are made from a suitable material, for example a suitable metal, for example stainless steel, and at least the support ring 52 of flexure member 50 is made from a different material, for example a different metal, or from silicon or fused quartz.

Without being bound to theory, it is believed that the thermal strains generated by the differential thermal expansions or contractions are essentially absorbed by the flexing or deformation of the mounting structures 80, thereby decoupling thermal strains from the support ring 52 and thus from the flexures 62. In this manner the support ring 52 (in particular the part thereof comprising the hinge structures 62) does not become distorted and/or does not introduce thermal bias into the accelerometer 100, or at least minimizes distortion and/or bias as compared to clamping the support ring 52 to the housing members 31 and 33 directly or via pads to prevent differential movement between the support ring 52 to the housing members 31 and 33, in the absence of said mounting structures 80.

Similarly, any mounting strains that may be introduced as a result of slight manufacturing or mounting errors between the support ring 52 on the one hand, and the housing members 31 and 33 on the other hand can also absorbed by the relative displacement between the free end 81 and the base end 89 of the mounting structures 80.

The lateral gap T provides a maximum limit to the movement of the free end 81 with respect to the base end 89 or base 83, and thus with respect to the well 84, and the dimension of T is thus chosen to allow for the maximum desired or expected range of differential movement between the support ring 52 and the housing members 31 and 33.

As already mentioned, the three pairs of mounting structures 80 are located one pair each at positions 90°, 180° and 270° on support ring 52 with respect to axis 59, and thus any differential thermal expansions or contractions between the support ring 52 on the one hand, and the housing members 31 and 33 on the other hand, are effectively isolated from or at least spaced away from, the flexures 62.

In alternative variations of this example, the mounting structures 80 in each pair are not necessarily co-axially aligned, but instead each mounting structure on one housing member 31 can be located in different positions with respect to the mounting structures on the other housing member 33; additionally or alternatively, the mounting structures 80 can be provided at other locations instead of one or more of positions 90°, 180° and 270° with respect to axis 59, for example at 60°, 180° and 300°. Additionally or alternatively, in such or other alternative variations of this example the accelerometer can comprise less than three pairs of mounting structures, for example 1 pair or 2 pairs of mounting structures 80 (exclusively or in combination with other types of mounting structures, for example conventional pads). Alternatively, in other alternative variations of this example the accelerometer can comprise more than three pairs of mounting structures, for example 4 or 5 or six or more pairs of mounting structures 80 (exclusively or in combination with other types of mounting structures, for example conventional pads). Additionally or alternatively, in such or other alternative variations of this example the accelerometer can comprise instead of paired sets of mounting structures, single mounting structures 80 on one side only of the support ring 52 or on one only of said housing member 31 or 33.

Figure 3C:
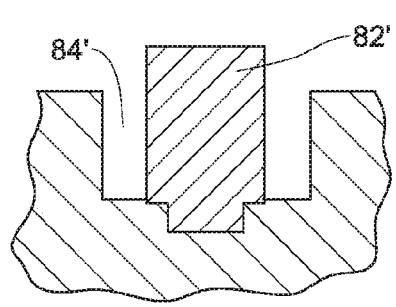
FIGS. 3(c) and 3(d) are partial transverse cross-sectional views of alternative variations of the example of FIGS. 3(a) and 3(b).
Figure 3D:
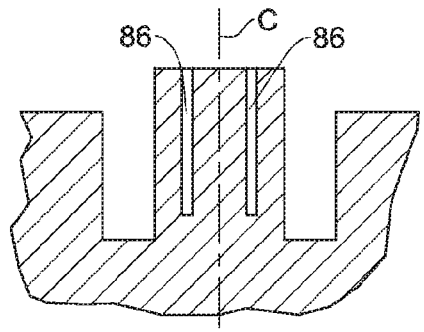

In this example, the mounting posts 82 are each integrally formed with the respective housing members 31 and 33, and for example can be suitably machined or cast with respect to the housing members 31 and 33. In alternative variations of this example, at least one mounting post 82' can be manufactured as a plug member, separately from the respective housing member 31 or 33, which comprises the respective well 84' formed therein, for example by machining or casting, and the mounting post is then affixed in the well, for example as illustrated in FIG. 3(c). While in the example of FIGS. 1 and 2 each mounting post 80 is formed as a prismatic solid, in alternative variations of this example at least one mounting post can be partially or fully hollow, or can comprise one or more slots 86 parallel to axis C, which can increase flexibility of the mounting post, for example as illustrated in FIG. 3(d).

It is to be noted that at least in some alternative variations of the first example the respective mounting structure does not require the respective well per se, and rather the respective mounting post projects from the inner facing surface of the respective housing member by the appropriate length L to ensure providing the desired or required relative displacement between the free end and the base end of the mounting post responsive to the differential movement between the support ring 52 and the housing 30, in particular the housing elements 31, 33.

By way of non limiting example, the ratio of length L to the width W of the mounting post 82 can be in the range about 0.3 to about 10, more preferably in the range about 1 to about 5, and more preferably about 3.

By way of non limiting example, the spacing T is within about 10% to about 20% of a width W.

By way of non limiting example, width W is between about 1 mm and about 4 mm, spacing T is about 0.1 mm to about 0.5 mm or up to 1 mm, length L is in the range about 0.3 mm to about 10 mm, more preferably in the range about 1 mm to about 5 mm, and more preferably about 3 mm, and depth d is in the range about 0.2 mm to about 9.5 mm, more preferably in the range about 1 mm to about 5 mm. In one such example, W is 2.5 mm, spacing T is 0.5 mm, and length L is 3.25 mm, and depth d is 3 mm.

In the first example, the mounting posts 82 are substantially identical to one another and have uniform circular cross-sections. Accordingly, each mounting post 82 can be bent or otherwise deformed in any direction parallel to plane P, and is not constrained to bend or otherwise deform in any particular such direction.

Figure 4A:
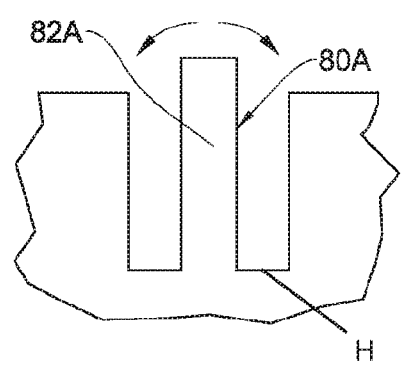
FIGS. 4(a) to 4(d) are partial transverse cross-sectional views of alternative variations of the examples of FIGS. 3(a) to 3(d).
Figure 4C:
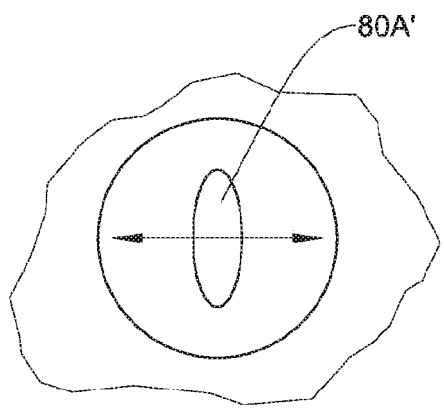
Figure 4B:
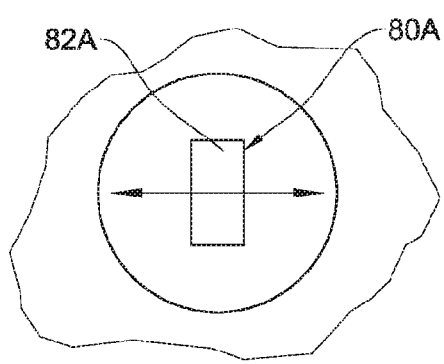
Figure 5:
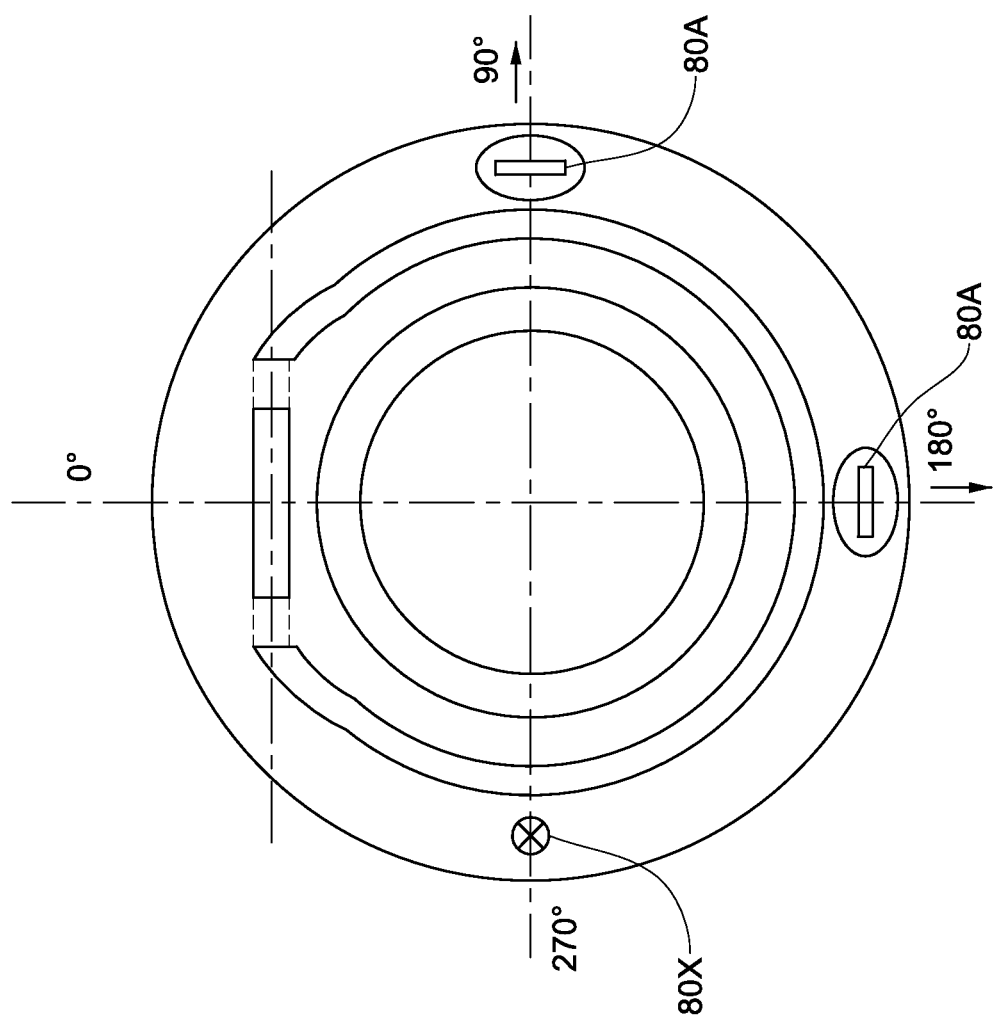
FIG. 5 is a plan view of an alternative variation of the example of FIG. 2.

In an alternative variation of this example, and referring to FIGS. 4(a) and 4(b), at least one mounting structure, herein designated 80A has all the features and elements of the mounting structure 80 of the example of FIG. 3(a) and FIG. 3(b), mutatis mutandis, with the main difference that the respective mounting post 82A has a rectangular cross-section, and thus preferentially bends or otherwise distorts along one direction parallel to plane P, i.e. orthogonal to the long sides of the rectangle. At the same time, the respective mounting post 82A provides more resistance to bending or distortion along a direction parallel to plane P that is orthogonal to the short sides of the rectangle. For example, and referring to FIG. 5, two such mounting structures 80A can be mounted to each respective housing member 31 or 33, one each at the 90° and 180° locations, and further comprising a conventional mounting pad 80X at location 270° (instead of a mounting structure 80 or 80A) that does not provide for differential movement between the support ring 52 and the housing members 31 and 33. The mounting posts 80A provided at the 90° are oriented with the long sides of the rectangular cross-section orthogonal to a line H joining the 90° and 270° locations, and thus preferentially allow for relative differential movement between the support ring 52 and the housing members 31 and 33 along a direction parallel to line H. The mounting posts 80A provided at the 180° location are oriented with the long sides of the rectangular cross-section orthogonal to a line V joining the 0° and 180° locations, and thus preferentially allow for relative differential movement between the support ring 52 and the housing members 31 and 33 along a direction parallel to line V. Since lines H and V are orthogonal to one another (and parallel to plane P), and there is no differential movement between the support ring 52 and the housing members 31 and 33 at the 270° location, all differential movement between the support ring 52 and the housing members 31 and 33 can be resolved along orthogonal directions V and H via the two pairs of mounting posts 80A.

FIG. 4(c) illustrates another variation of the example of FIGS. 4(a), 4(b), in which the respective mounting post, designated 80A', has an elliptical cross-section, and the mounting post 80A' preferentially bends or otherwise deforms along a direction orthogonal to the major axis of the ellipse.

Figure 4D:
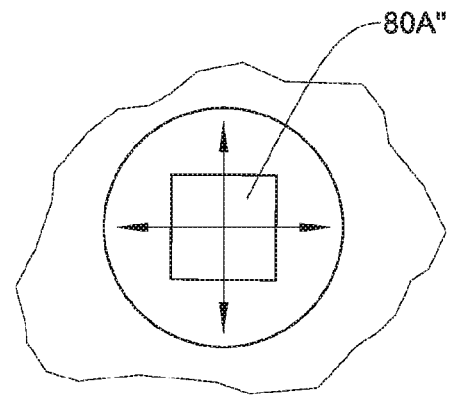

FIG. 4(d) illustrates yet another variation of the example of FIGS. 4(a), 4(b), in which the respective mounting post, designated 80A", has an square cross-section, and the mounting post 80A" has two preferential directions for bending or otherwise deforming, i.e., along directions orthogonal to the four sides of the square.

It is readily apparent that the cross-section of the mounting post can be chosen to provide bending or distortion of the mounting post in one or more preferred directions with respect to plane P.

Figure 6A:
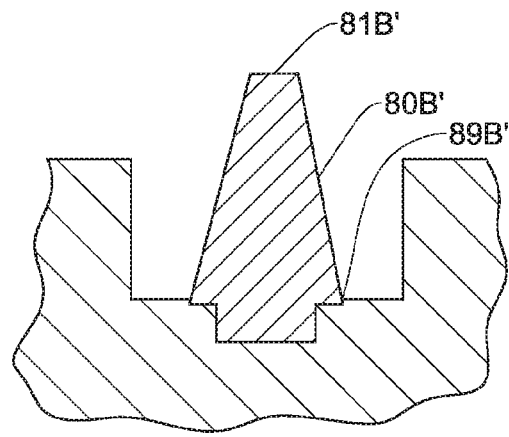
FIGS. 6(a) to 6(c) are partial transverse cross-sectional views of alternative variations of the examples the mounting structure of FIGS. 1 to 5.
Figure 6B:
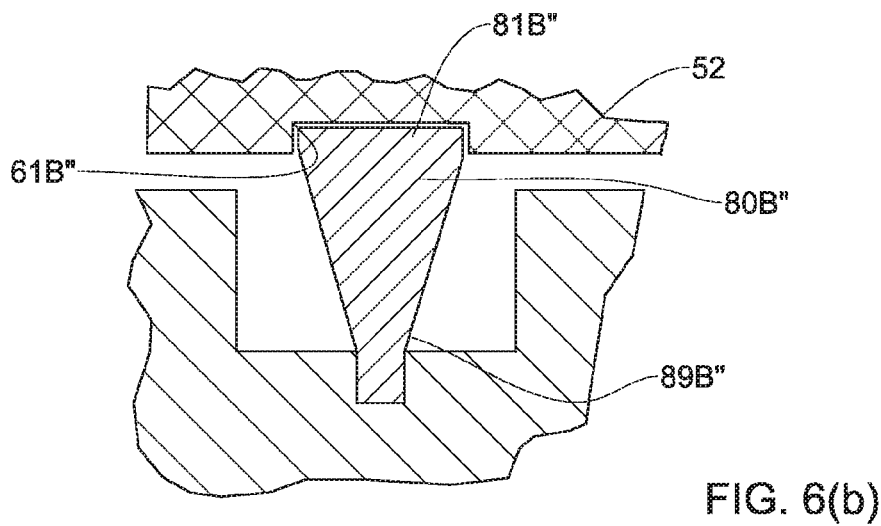
Figure 6C:
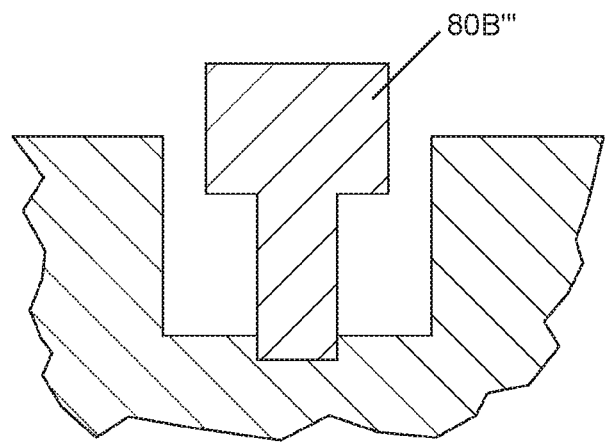

Referring to FIGS. 6(a) and 6(b), in alternative variations of the examples illustrated in FIGS. 1 to 5, the respective mounting post, designated 80B' and 80B", can have a non-uniform cross-section along its longitudinal length. For example, referring to FIG. 6(a), the mounting post 80B' has a cross-section that diminishes from the respective base 89B' to the respective free end 81B', and thus is more resistant to bending or deforming than a corresponding mounting post of uniform cross-section having a cross-section comparable to the average cross-section of mounting post 80B'. For example, referring to FIG. 6(b), the mounting post 80B" has a cross-section that increases from the respective base 89B" to the respective free end 81B", and thus is less resistant to bending or deforming than a corresponding mounting post of uniform cross-section having a cross-section comparable to the average cross-section of mounting post 80B"; at the same time having a relatively larger respective free end 81B" can be useful in reducing the local stresses at the respective recess 61B" formed in the support ring 52. A variation of the example of FIG. 6(b) is illustrated in FIG. 6(c), with the mounting post designated 80B'". For example, the mounting posts illustrated in FIGS. 6(a) to 6(c) can be manufactured as plugs and mounted to the housing members 31, 33 in a similar manner to that disclosed herein for the plugs of FIG. 3(c), mutatis mutandis.

Thus, the profile and/or the solidity of the cross-section of the respective mounting post, and/or the longitudinal variation of the cross-section thereof, can be designed to control or limit the manner and range of differential movement between the support ring 52 and the housing members 31 and 33.

Figures 7A, 7B:
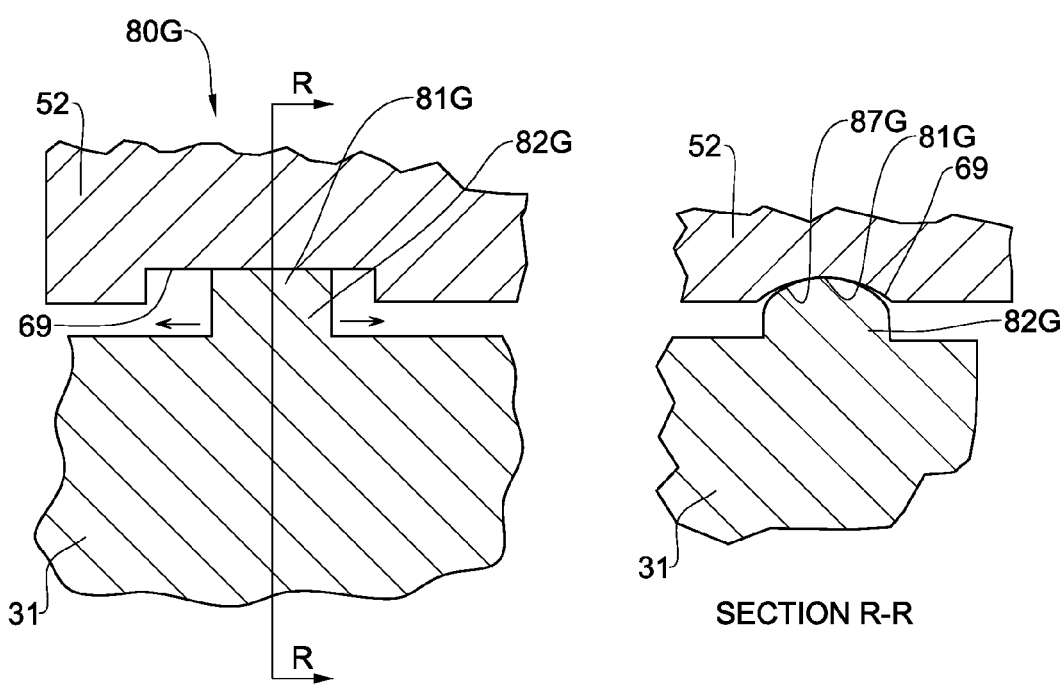
FIGS. 7(a) to 7(b) are partial transverse cross-sectional views of an alternative variation of the examples the mounting structure of FIGS. 1 to 6(c).

In a variation of the first example, and referring to FIGS. 7(a) and 7(b), the free end 81G of the corresponding mounting post 82G of the respective mounting structure 80G is not received and locked in place via a recess in the support ring 52 or is otherwise fixedly abutted, i.e., anchored, to the support ring 52. Rather, the free end 81G is configured for relative sliding displacement with respect to the support ring 52, while at the same time providing clamping contact between the housing 30 and the ring member 52. It is to be noted that in this example, the mounting structure 80G does not require a well to be provided in the respective housing member 31 or 33, nor to be cantilevered at the base of such a well; rather, the mounting post 82G can project directly from a respective surface of the housing member 31 or 33. In this example, the free end 81G has a convexly part-cylindrical contact surface 87G that is configured to slide radially with respect to a complementarily-shaped radial groove 69 formed in the support ring 52. Thus, in response to a differential displacement between the support ring 52 and the corresponding housing member 31, the free end 81G of mounting post 82G (which is clampingly and slidingly mounted to the support ring 52) moves with respect to the groove 69 along the radial direction of the groove. Thus, an arrangement can be provided similar to that illustrated in FIG. 5, in which two such mounting structures 80G can be mounted to each respective housing member 31 or 33, one each at the 90° and 180° locations, and further comprising a conventional mounting pad 80X at location 270° that does not provide for differential movement between the support ring 52 and the housing members 31 and 33. The mounting posts 80G provided at the 90° allow for relative differential sliding movement between the support ring 52 and the housing members 31 and 33 along a direction parallel to line H. The mounting posts 80G provided at the 180° allow for relative differential movement between the support ring 52 and the housing members 31 and 33 along a direction parallel to line V. All differential movement between the support ring 52 and the housing members 31 and 33 can be resolved along orthogonal directions V and H via the two pairs of mounting posts 80G. Alternatively, the free end 81G has a convexly part-spherical contact surface that is configured to slide with respect to a relatively wide slot formed in the support ring 52. Thus, in response to a differential displacement between the support ring 52 and the corresponding housing member 31, the free end 81G of mounting post 82G (which is clampingly and slidingly mounted to the support ring 52) slides with respect to the slot along any direction parallel to plane P, and thus three such pairs of mounting posts 80G can be provided in configuration relative to the housing 30 and the flexure member 50 as disclosed herein for the example of FIGS. 1 and 2, mutatis mutandis.

Figure 8:
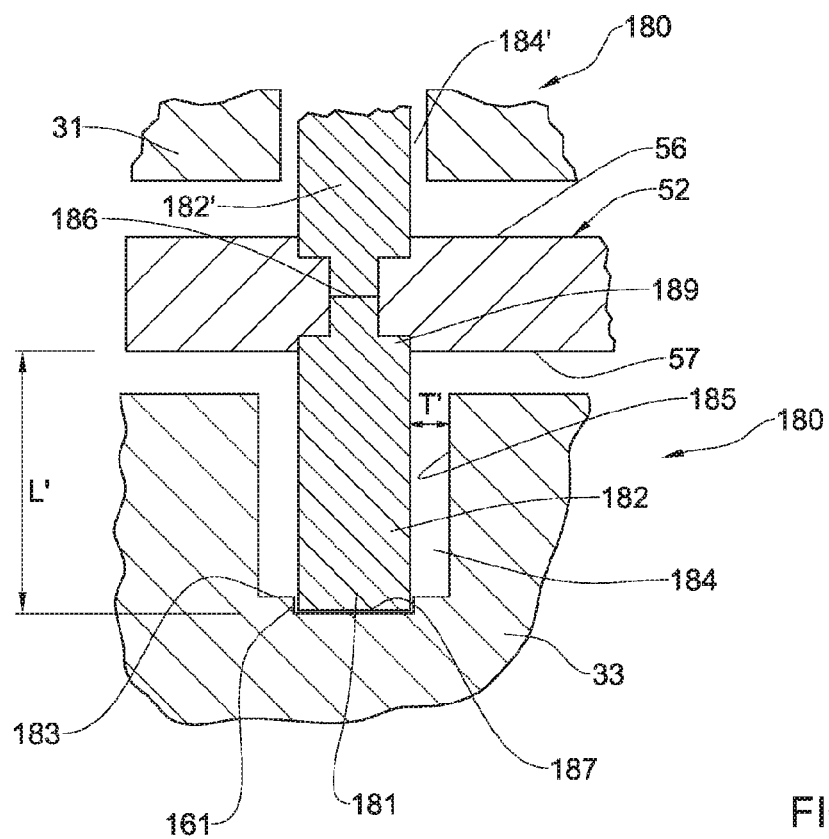
FIG. 8 is a partial transverse cross-sectional view of a mounting structure according to a second example of the presently disclosed subject matter.

Referring to FIG. 8, a mounting structure 180 according to a second example thereof, comprises the elements and features of the first example of the mounting structure and/or alternative variations thereof as disclosed herein, mutatis mutandis, with some differences as will become clearer herein. In the second example, the mounting structure 180 comprises a mounting post 182, similar to the mounting post of the first example or alternative variations thereof, mutatis mutandis, but with a base end 189 thereof being cantileverly mounted to the support ring 52, rather than to the respective housing member 31 or 33. When the accelerometer is assembled, the mounting post 182 is concentrically received in well 184, formed on the respective housing member 31 or 33, and is separated from the walls 185 thereof by a lateral gap T', similar to the corresponding well of the first example, mutatis mutandis. The free end 181 of mounting structure 180 comprises a generally flat face 187 and is received and fixedly retained in a complementarily-shaped shallow recess 161 formed in the base 183 of well 184, similar to recess 61 of the first example, mutatis mutandis, and thus the mounting post 182 has a length L' correlated to the spacing between the face 57 of the support ring 52 and the base 183. In this example, the mounting post 182 is a prismatic solid, having a uniform circular cross-section along its longitudinal length from base end 189 to free end 181, which are aligned along longitudinal axis C', generally parallel to the sensing axis A. In alternative variations of the second example, the mounting post can have a non-uniform cross-section, and/or a non circular cross-section, for example analogous to the examples illustrated in FIGS. 4(a) to 6(c), mutatis mutandis.

The mounting post 182 is configured for allowing the free end 181 to be displaced with respect to the base end 189 responsive to a lateral force Q being applied to the free end, in a direction generally parallel to plane P, in a manner similar to that of the first example, mutatis mutandis. In particular, such a displacement is reversible, so that in the absence of force Q, the free end 181 returns to its initial position with respect to the base end 189. In this example, such a displacement is provided by any one of reversible bending, or otherwise deforming (including shearing) the mounting post 182.

The lateral gap T' provides a limit to the movement of the base end 189 with respect to the free end 181 and thus the well 184, and is thus chosen to allow for the maximum range of differential movement between the support ring 52 and the housing members 31 and 33.

The mounting post 182 can be made from the same material as that of the ring member 50, or of the housing members 31, 33 or a different material.

In the example of FIG. 8, there is a second mounting post 182', similar to mounting post 182, mutatis mutandis, mounted to face 56 of the support ring 52, back-to-back with respect to the mounting post 182 that is mounted to face 57. The second mounting post 182' is also received in a corresponding well 184' formed on the other housing member, similar to well 184, mutatis mutandis, and operates in similar manner to mounting post 182, mutatis mutandis. For example, the two mounting posts 182, 182' can be interlinked via a connection 186 as illustrated in FIG. 8.

Figures 9A, 9B:
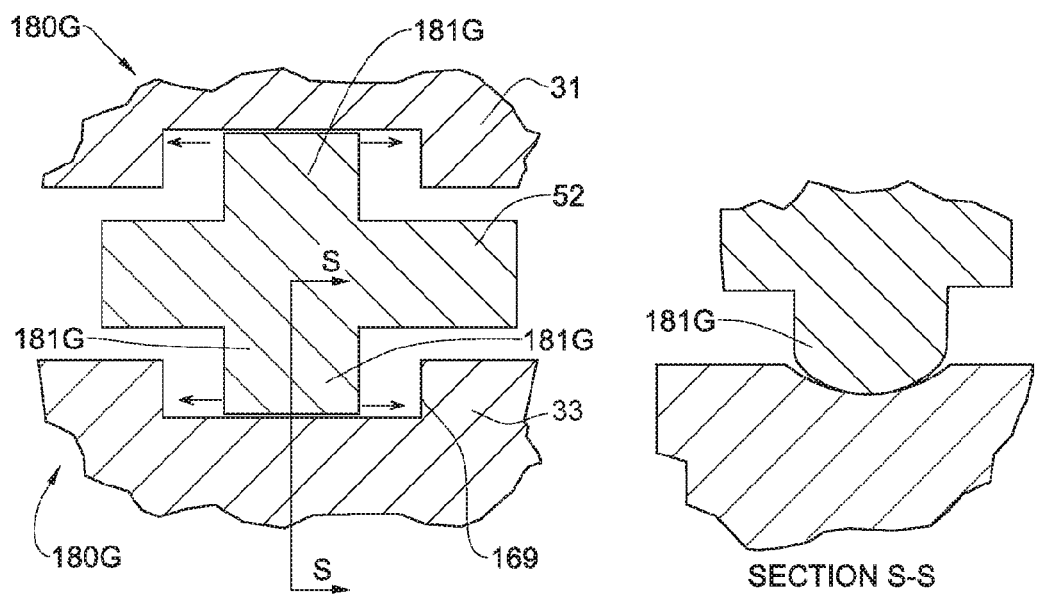
FIGS. 9(a) to 9(b) are partial transverse cross-sectional views of an alternative 25 variation of the example of FIG. 8.

In a variation of the example of FIG. 8, and referring to FIGS. 9(a) and 9(b), at least one mounting structure 180G is provided having the free end 181G of the respective mounting post 180G that is not received and locked in place via a recess; rather, the free end 181G is configured for sliding with respect to a groove 169 or slot provided in the respective housing member 31 or 33, while at the same time providing clamping contact between the housing 30 and the ring member 52, in a similar manner to the example illustrated in FIGS. 7(a) and 7(b) or alternative variations of the example illustrated therein, mutatis mutandis.

It is to be noted that an accelerometer according to at least one example of the present presently disclosed subject matter can comprise any desired number of mounting structures (singly, or in faced pairs, or in staggered pairs, for example), with any desired combination or permutation of different configurations of mounting structures being provided for clamping the respective support ring to the respective housing members, for example any combination of the examples of the mounting structures illustrated in FIGS. 1 to 9(b) herein or alternative variations thereof.

Finally, it should be noted that the word "comprising" as used throughout the appended claims is to be interpreted to mean "including but not limited to".

While there has been shown and disclosed example examples in accordance with the presently disclosed subject matter, it will be appreciated that many changes can be made therein without departing from the spirit of the presently disclosed subject matter.

The invention claimed is:
1. An accelerometer for sensing acceleration along a sensing axis, comprising:
 a flexure member, comprising a pendulum member pivotably connected to a support member via a hinge arrangement;
 a housing; and
 at least one mounting structure configured for clamping the support member to the housing in load bearing contact while concurrently allowing for differential movement between the support member and the housing in at least one direction different from said sensing axis;
 wherein at least one said mounting structure comprises an elongated mounting post, anchored at a first longitudinal end thereof to the housing and anchored at the second longitudinal end thereof to the support member, wherein the mounting post is configured for allowing displacement between said first longitudinal end and said second longitudinal end along a plurality of axes orthogonal to said sensing axis to permit at least a portion of said differential movement between the support member and the housing.

2. The accelerometer according to claim 1, wherein said mounting post is cantilevered from said housing at said first longitudinal end and removably affixed to said support member at said second longitudinal end, wherein said mounting post is accommodated within a well formed in said housing, and wherein said second longitudinal end projects outwardly from a mouth of said well.

3. The accelerometer according to claim 1, wherein said mounting post is integrally formed with or fixedly mounted to said housing.

4. The accelerometer according to claim 1, wherein said mounting post is formed as a solid beam element having a cross-section that is uniform or varies along the longitudinal axis of the beam element.

5. The accelerometer according to claim 1, wherein said mounting post is configured for allowing displacement between said first longitudinal end and said second longitudinal end in a plurality of non-parallel directions orthogonal to said sensing axis.

6. The accelerometer according to claim 1, wherein said housing comprises two housing members configured for accommodating therebetween said flexure member.

7. The accelerometer according to claim 6, comprising at least three said mounting structures associated with each said housing member.

8. The accelerometer according to claim 7, wherein each said mounting structure associated with one said housing member is in longitudinally opposed relationship with a corresponding said mounting structure associated with the other said housing member.

9. The accelerometer according to claim 6, wherein said pendulum member is pivotably connected to said support member via a hinge arrangement, and wherein said mounting structures are located with respect to said flexure member at positions of 90°, 180° and 270° about a center axis thereof, the 0° position being associated with said hinge arrangement.

10. The accelerometer according to claim 1, wherein said mounting structures are configured for isolating said pendulum member from strain effects arising from said differential movement.

11. The accelerometer according to claim 1, wherein said flexure member and said housing comprise different thermal properties one from the other at least along directions orthogonal to said sensing axis.

12. The accelerometer according to claim 1, wherein said flexure member and said housing are made from materials having different coefficients of thermal expansion one from the other at least along directions orthogonal to said sensing axis.

13. The accelerometer according to claim 1, wherein said flexure member is made from a non-metallic material and said housing is made from a metallic material.

14. The accelerometer according to claim 1, wherein said flexure member is made from a material including at least one of the following: a metallic material, stainless steel, aluminum, titanium or alloys thereof; composites; silicon; fused quartz; a ceramic material; or a non-metallic material; and wherein said housing is made from a material including at least one of the following: a metallic material, stainless steel, aluminum, titanium or alloys thereof; composites; silicon; fused quartz; a ceramic material; or a non-metallic material.

15. The accelerometer according to claim 1, wherein said mounting structure is at least one of deformable, bendable, or shearable for allowing said differential movement between the support member and the housing.

16. The accelerometer according to claim 1, wherein said mounting post is configured for allowing displacement between said first longitudinal end and said second longitudinal end in a direction orthogonal to said sensing axis by any one of bending, deforming or shearing of the mounting post with respect to a longitudinal axis of the mounting post.

17. The accelerometer according to claim 1, wherein said mounting structure is slidable for allowing said differential movement between the support member and the housing.

18. The accelerometer according to claim 1, further comprising a force sensing system configured for sensing movement of the pendulum member from a datum position in response to an acceleration or force applied to accelerometer along said sensing axis and for generating an output that is a measure of said acceleration or force.

19. The accelerometer according to claim 1, further comprising a force sensing system configured for sensing movement of the pendulum member from a datum position in response to an acceleration or force applied to accelerometer parallel to said sensing axis, for generating a restoring or balancing force to the pendulum member to return the pendulum member to the datum position, and for generating an output that is indicative of the restoring force, which in turn provides a measure of said acceleration or said force.

20. The accelerometer according to claim 1, wherein at least one said mounting structure is configured for clamping in load bearing contact the support member to the housing in a direction generally parallel to said sensing axis while concurrently allowing for said differential movement between the support member and the housing in at least one direction orthogonal to said sensing axis.

21. A housing member for use with a flexure member of an accelerometer for sensing acceleration along a sensing axis, the flexure member comprising a pendulum member hingedly connected to a support member via a hinge arrangement, the housing member comprising at least one mounting structure configured for clamping in load bearing contact the flexure member to the housing member while concurrently allowing for differential movement between the support member and the housing member in a direction orthogonal to said sensing axis;

wherein at least one said mounting structure comprises an elongated mounting post, anchored at a first longitudinal end thereof to the housing member and configured to be anchored at the second longitudinal end thereof to the support member, wherein the mounting post is configured for allowing displacement between said first longitudinal end and said second longitudinal end along a plurality of axes orthogonal to said sensing axis to permit at least a portion of said differential movement between the support member and the housing member.

22. The housing member according to claim 21, wherein said mounting structure is at least one of deformable, bendable, or shearable for allowing said differential movement between the support member and the housing member.

23. A flexure member for use with a housing of an accelerometer for sensing acceleration along a sensing axis, the flexure member comprising:

a pendulum member hingedly connected to a support member via a hinge arrangement; and at least one mounting structure configured for clamping in load bearing contact the support member to the housing while concurrently allowing for differential movement between the support member and the housing in a direction orthogonal to said sensing axis;

wherein at least one said mounting structure comprises an elongated mounting post, anchored at a first longitudinal end thereof to the support member and configured for being anchored at the second longitudinal end thereof to the housing, wherein the mounting post is configured for allowing displacement between said first longitudinal end and said second longitudinal end along a plurality of axes orthogonal to said sensing axis to permit at least a portion of said differential movement between the support member and the housing.

24. The flexure member according to claim 23, wherein said mounting structure is at least one of deformable, bendable, or shearable for allowing said differential movement between the support member and the housing.

25. An accelerometer for sensing acceleration along a sensing axis, comprising:

a flexure member, comprising a pendulum member pivotably connected to a support member via a hinge arrangement;

a housing; and at least one mounting structure configured for clamping the support member to the housing in load bearing contact while concurrently allowing, at least at the location of said load bearing contact, for at least a portion of a differential displacement between the support member and the housing;

wherein at least one said mounting structure comprises an elongated mounting post, anchored at a first longitudinal end thereof to the housing and anchored at the second longitudinal end thereof to the support member, wherein the mounting post is configured for allowing displacement between said first longitudinal end and said second longitudinal end along a plurality of axes orthogonal to orthogonal to said sensing axis to permit at least a portion of said differential movement between the support member and the housing.

* * * * *